Patented Dec. 26, 1944

2,365,777

UNITED STATES PATENT OFFICE 2,365,777

6-IODO-d-GALACTOSE

Albert L. Raymond, Northfield, and Elmer F. Schroeder, Chicago, Ill., assignors to G. D. Searle & Co., Skokie, Ill., a corporation of Illinois No Drawing. Application September 15, 1943, Serial No. 502,543

1 Claim. (Cl. 260—210)

The purpose of the invention is to provide a new compound which is capable, among other uses, of being employed as a kidney visualization agent to facilitate the making of X-ray photographs.

The primary object of this invention is to provide a readily water-soluble, non-toxic compound containing a relatively high proportion of organically-bound iodine, and which, following intravenous injection, will be rapidly excreted through the kidney in sufficient concentration to render the kidney and allied structures more opaque to X-rays than surrounding tissue. We have found that a new compound 6-iodo-d-galactose, having the formula:

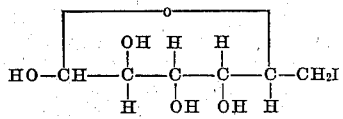

may be successfully produced and completely achieves this object, being, in fact, a most useful drug for clinical kidney visualization.

The prior art has disclosed a number of water-soluble organic iodine compounds for this purpose, several of which are in clinical use at this time by the medical profession. Among these, it has been suggested in British Patent No. 361,437 that glucose iodohydrin should be useful for this purpose, though so far as we are aware this suggestion has not been carried into practical use. Such lack of use is not surprising to us for, as is disclosed in our copending application, Serial No. 502,542, filed September 15, 1943, we have prepared this compound and have found it without practical utility as a kidney visualization agent. We have been able to obtain the compound only as a non-crystallizing syrup which is disadvantageous to handle and relatively difficult to purify to the extent required for internal administration. The purest sample which we were able to obtain showed a rotation of $[\alpha]_D^{25} = +32.5°$ in 5 per cent aqueous solution, and formed a phenylosazone which melted at 134° centigrade with decomposition. We have found that after injection in doses comparable to those employed with other successful drugs used in this art (including the iodo-d-galactose which is the subject of this invention), it is not concentrated or excreted with sufficient rapidity by the kidney to cast an adequate shadow in X-ray radiography.

However, in spite of the fact that galactose differs from glucose only in the stereoisomeric arrangement of the groups on certain of their carbon atoms, we have found that 6-iodo-d-galactose (galactose iodohydrin) does not exhibit the undesirable properties shown by iodoglucose and is, in fact, a safe, desirable, reliable and efficient agent for causing visualization of the kidney under X-ray examination. It is a crystalline compound, readily obtained in a high state of purity; it is very soluble in water so that a dose sufficient to achieve the desired result may be injected in a relatively small volume; and its excretion through the kidney is such that clear, definitive pictures may readily be obtained by proper technique.

We have found that 6-iodo-d-galactose is most satisfactorily prepared from iododiacetonegalactose according to the method set forth in the following example. The compound iododiacetonegalactose is well known to prior workers in the art (see Berichte der Deutschen Chemische Geselschaft, vol. 60, p. 1633), but so far as we are aware, no one has heretofore succeeded in removing the acetone groups to leave the free, pure iodosugar.

*Example.*—A solution of 75 grams of 6-iodo-1,2,3,4-diacetone-d-galactose in 300 cubic centimetres of glacial acetic acid is immersed in a boiling water bath, and 300 cubic centimetres of water added gradually during 30 minutes. Heating is continued for a total of three hours, whereupon the solution is treated with decolorizing carbon and then concentrated to about 100 cubic centimetres by vacuum distillation. Two hundred cubic centimetres of alcohol are then added to the residue, and the solution is again concentrated. This alcohol treatment is repeated a second time, toward the end of which second treatment the desired 6-iodogalactose begins to crystallize. The residue is cooled to complete the crystallization and the crystals are then filtered and recrystallized from absolute alcohol. As thus obtained, 6-iodo-d-galactose forms rectangular plates whose melting points is 105° to 106° centigrade. It is exceedingly soluble in water, moderately soluble in alcohol, acetone, and ethyl acetate, and insoluble in ether, chloroform, benzol and petroleum ether. It exhibits mutarotation in aqueous solution, reaching an equilibrium value of $[\alpha]_D^{25°} = +69°$. Aqueous solutions strongly reduce Fehling's solution when warmed, and form a precipitate almost immediately, even in very dilute solution, with a solution of phenylhydrazine in dilute acetic acid.

In the above example, other dilute acids can be used to accomplish the hydrolysis, such as for instance a 5 per cent solution of sulfuric acid in 50 per cent aqueous alcohol. In such a case, the acid is preferably neutralized at the end of the hydrolysis and sulfate ions precipitated by solid barium carbonate before proceeding with the alcohol evaporations as above.

The following is an example of the use of this compound for X-ray visualizations: A dose of 3 cubic centimetres of a 40 per cent aqueous solution of 6-iodo-galactose per kilogram of body weight is injected intravenously into a rabbit. Visualization of the kidney is apparent in about five minutes, is at maximum in about fifteen minutes and virtually disappears in about one hour. Approximately 50 per cent of the injected iodine is recovered in the urine in a few hours. In such doses, the compound shows no toxic or undesirable side effects.

For use in man, the dose is much lower on a per kilogram basis, averaging about 0.3 cubic centimetre per kilogram. This dose is administered to human beings by injection and is safe and reliable. Due probably to its prompt excretion, the X-ray pictures obtained are in many respects superior to those obtained by the use of other contrast media available.

I claim:

A new composition of matter consisting of 6-iodo-d-galactose of the formula:

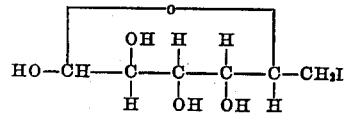

ALBERT L. RAYMOND.
ELMER F. SCHROEDER.